(12) United States Patent
Lee

(10) Patent No.: US 6,577,725 B1
(45) Date of Patent: Jun. 10, 2003

(54) PREFIX TRANSLATION DISPERSED CONFIGURATION AND METHOD FOR EXCHANGE SYSTEM

(75) Inventor: Jeong Ok Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/369,858

(22) Filed: Aug. 9, 1999

(30) Foreign Application Priority Data

Oct. 22, 1998 (KR) .......................................... 98-44355

(51) Int. Cl.[7] .......................... H04M 3/00; H04M 7/00; H04L 12/50
(52) U.S. Cl. .................... 379/242; 379/221.12; 370/360
(58) Field of Search ................................ 379/242–245, 379/229, 230, 207.02, 221.12, 221.14; 370/342, 352, 360, 351

(56) References Cited

U.S. PATENT DOCUMENTS 5,448,617 A  * 9/1995 Hong et al. ............. 379/221.12
5,937,053 A  * 8/1999 Lee et al. ............... 379/221.14
5,937,413 A  * 8/1999 Hyun et al. ................. 707/201
6,233,233 B1 * 5/2001 Heo ........................... 370/352
6,393,009 B1 * 5/2002 Shin et al. ................... 370/342

* cited by examiner

Primary Examiner—Benny Q. Tieu
(74) Attorney, Agent, or Firm—Fleshner & Kim, LLP (57) ABSTRACT

A prefix translation dispersed configuration and method according to the present invention performs a number translation by dividing into a prefix translation and a suffix translation, the prefix translation being processed in a prefix translation library provided in ASSs and the suffix translation being performed in a number translation block of an INS as in the conventional art. The prefix translation library is located in a common area that is previously defined to be accessible by all of the control blocks and performs a prefix translation request generated during a call process through a library call.

21 Claims, 4 Drawing Sheets

PREFIX TRANSLATION DISPERSED CONFIGURATION AND METHOD FOR EXCHANGE SYSTEM

BACKGROUND OF THE INVENTION

1. Field of the Invention

The present invention relates to a prefix translation dispersed configuration for an exchange system, and more particularly to a prefix translation dispersed configuration and method for an exchange system having a dispersed number translation processing system.

2. Description of the Conventional Art

In an exchange system, a speed of processing communication between processors considerably affects a system performance. Thus, on a hardware side processors are intended to have a dispersed configuration considering a traffic environment or an economical situation, and on a software side it has been provided programs that simplify a call processing sequence so that unnecessary IPC (Inter Processor Communication) on the sequence is not generated.

Figure 1:
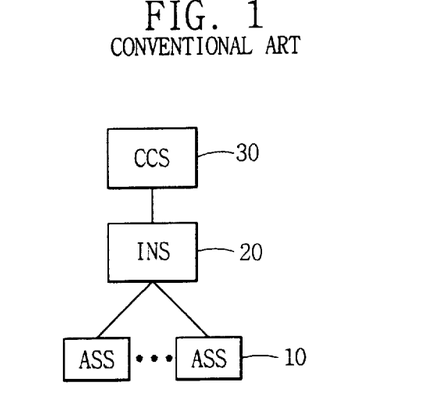
FIG. 1 is a schematic block diagram illustrating an exchange system according to locations of physical resources.

FIG. 1 is a schematic diagram illustrating an exchange system according to locations of physical resources.

As shown therein, the exchange system consists of ASSs (Access Switching Subsystems) 10 matching users to trunk lines, an INS (Interconnection Network Subsystem) 20 connecting the ASSs 10 or the ASSs 10 to a CSS 30 and a CCS (Central Control Subsystem) 30 performing general control, application and maintenance of the exchange system.

More particularly, each ASS 10 provided with a user and trunk line matching device, a time switch and various signal devices performs dispersed call process. The ASS 10 systematically having a horizontally dispersed configuration to the INS 20 and forty four ASSs 10 at its maximum can be connected to the INS 20. The INS 20 performs number translation, that is, prefix and suffix code translation, route control, space switch connection, user information storing and management. Thus, blocks that perform call processing functions, such as number translation, routing and switching functions, are located in the INS 10. While, the CCS 30 has statistics on maintenance and application of a system, mass storage control/management, and user instruction control.

In such an exchange system, when a call is generated by a user, the ASSs 10 requests information of the user to the INS 20. The ASSs 10 which receive an originating user information perform a necessary call service function and request number translation to the INS 20 which translates the number and sets a speech path of the incoming outing ASSs through speech path search and connection. ASSs (not shown) on a call receiving side perform incoming call services. When the call is completed, the incoming outing ASSs return call data to idle states and the originating ASSs 10 inform the CSS 10 of charging data.

In addition, a failure state of the ASSs 10 or the INS 20 is informed to the CCS 30 which performs the application and maintenance of the exchange system in accordance with the received information and transmits a corresponding instruction to the ASSs 10 or the INS 20.

The number translation must be served to all calls going for destinations and a telephone number (hereinafter, called digits) which the user dials is a key to the destination, which means the originating user assigns a specific called subscriber. Accordingly, all the calls are determined whether to be received to a specific line or to be outgone to a station by the number translation.

The number translation which becomes the key to the call connection is divided into prefix translation and suffix translation and those translation performances are generally carried out in the INS 20. Thus, the exchange system stores number data therein as a table to analyze a prefix, a special service code, a suffix and an area code which can be processed in an intra-office for the number translation, and retrieves prefix and suffix tables with received digits as a key, thereby translating a corresponding number.

Figure 2:
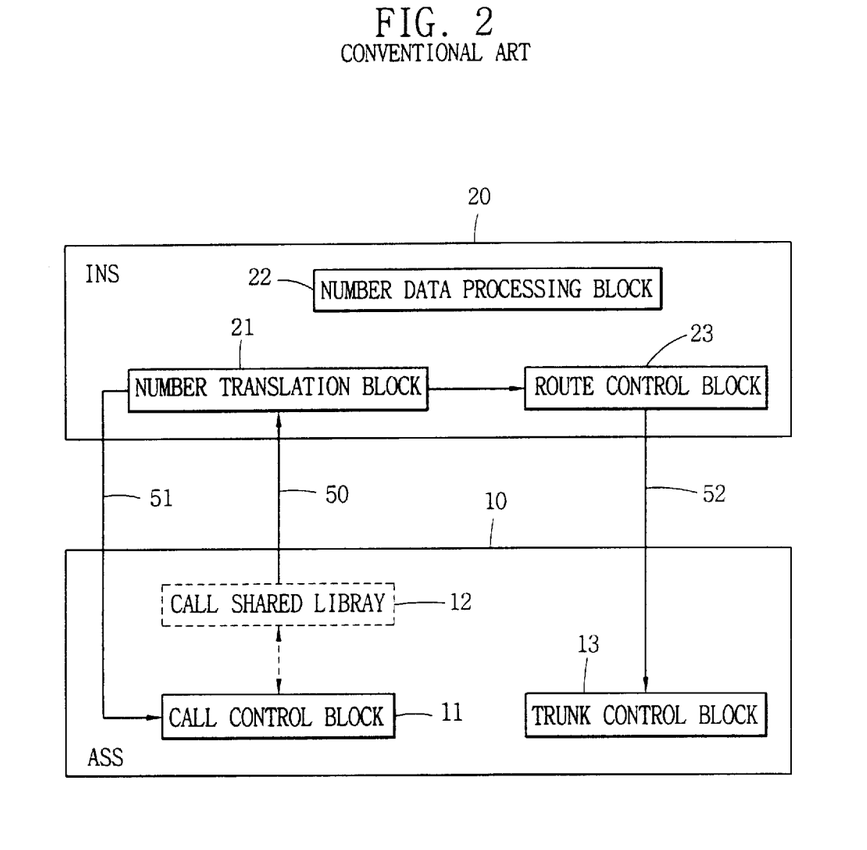
FIG. 2 is a block diagram illustrating a number translation processing configuration of a conventional exchange system.

FIG. 2 is a block diagram which detaildely illustrates a conventional number translation processing configuration.

As shown therein, the conventional number translation processing configuration is constituted of a call control block 11, a call shared library block 12 and a trunk control block 13 that are provided in the ASS 10 and a number translation block 21, a number data processing block 22 and a route control block 23 that are provided in the INS 20. Thus, the number translation is accomplished by the IPC transmission and receive between the ASS 10 and the INS 20 and a call processing function from a call start and a call cancel is accomplished by a linkage of the call control block 11 of the ASS 10, the number translation block 21 of the INS 20, a switching block (not shown) and the route control block 23.

Specifically, the call control block 11, in accordance with characteristics of a terminal, has at least twenty blocks including a general voice subscriber call control block, a general ISDN (integrated service digital network) subscriber call control block, a packet subscriber call control block, a V5.2 subscriber call control block, an R2 call control block, a No 7 trunk call control block, and various special service call control blocks, the call control block 11 performing a required call service and collecting the predetermined number of digits from a subscriber terminal or a trunk, for thereby calling the call shared library 12. Here, the number of initially required digits which is previously set is generally 3 used for the number translation.

The call shared library block 12 extracts digits and various call informations required for the number translation from a common area in accordance with a library call from the call control block 11, the extracted digits and informations being outputted to the INS 20 through an IPC link 50. The trunk control block 13 seizes a trunk for transiting a call to the terminating station in accordance with a trunk seizing signal which is inputted from the route control block 23 through an IPC link 52.

Further, the number translation block 21 retrieves prefix and suffix tables in a point-to-point manner with digits received from the call shared library block 12 as a key and thus informs the call control block 11 of a corresponding information and a translation result through an IPC link 51 if there is a corresponding prefix or suffix. The number translation block 21 requests the route control block 23 to perform an outgoing routing process when the translation result is proven that a call type is an outgoing.

The number data processing block 22 performs generation, reference, change and cancel of data related to a prefix which is necessary for the number translation in accordance with an instruction of an operator, while the route control block 23 searches a route through which a corresponding call is transited in accordance with the outgoing routing request of the number translation block 21 and then outputs a trunk seizing control signal.

Now, an operation of the conventional number translation processing configuration will be described with the accompanying drawings.

When a call is generated from a user or an originating station, the call control block 11 collects digits, for example, three digits, that are necessary for the prefix translation through a user terminal or trunk. When the digits which are necessary for the prefix translation, the call control block 11 calls a prefix translation request library of the call shared library block 12 and thus extracts the digits and various call informations necessary for the prefix translation and requests the prefix translation to the number translation block 21.

The number translation block 21 translates the received prefix, that is, searches the prefix table of the number data processing block 22 in the point-to-point manner with the received digits as a key, thereby checking whether there exists a prefix corresponding to the received digits. As a result of the translation, if the corresponding prefix exists, that is, the received digits are a normal prefix, the number translation block 21 obtains information required for a process of an outgoing call, an incoming call, a transit call or an intra-office call from the prefix table in accordance with a call type and then informs the call control block 11 of a prefix translation result through the IPC link 51. Here, the prefix table (or a suffix table) is defined as data that can be only accessed by the INS 20.

If the call type is the outgoing call or transit call and there are sufficient digits for a routing process in the number translation block 21, the number translation block 21 requests the route control block 23 to directly perform an outgoing routing process and informs the call control block 11 of which the translation result is turned out to be an outgoing prefix. Thus, the route control block 23 searches a route through which the outgoing or transit call is transited and requests the trunk control block 13 to seize a trunk and then the trunk control block 13 seizes the corresponding trunk and transits the call to a terminating station.

While, if the digits are insufficient, the number translation block 21 obtains the number of digits necessary for the prefix translation and requests additional digits to the call control block 11. If the prefix is unobtainable or changed, the number translation block 21 informs the call control block 11 of the corresponding result. Thus, the call control block 11 requested to provide the additional digits collects additional digits as many as the number of necessary digits from the user terminal or the originating station and requests again the prefix translation to the number translation block 21.

In the conventional exchange system, data related to the number translation, such as the prefix table and the suffix table, are accessible only in the INS. Thus, the number translation process (the prefix and suffix translation) carried out with reference to the number translation related data is only processed by the INS. Accordingly, in congestion of calls, the number translation process weighs load of the INS and thus an overall call process capacity of the system becomes subject to performance of the INS, which affects the exchange system in terms of the service as well as the performance.

Figure 3:
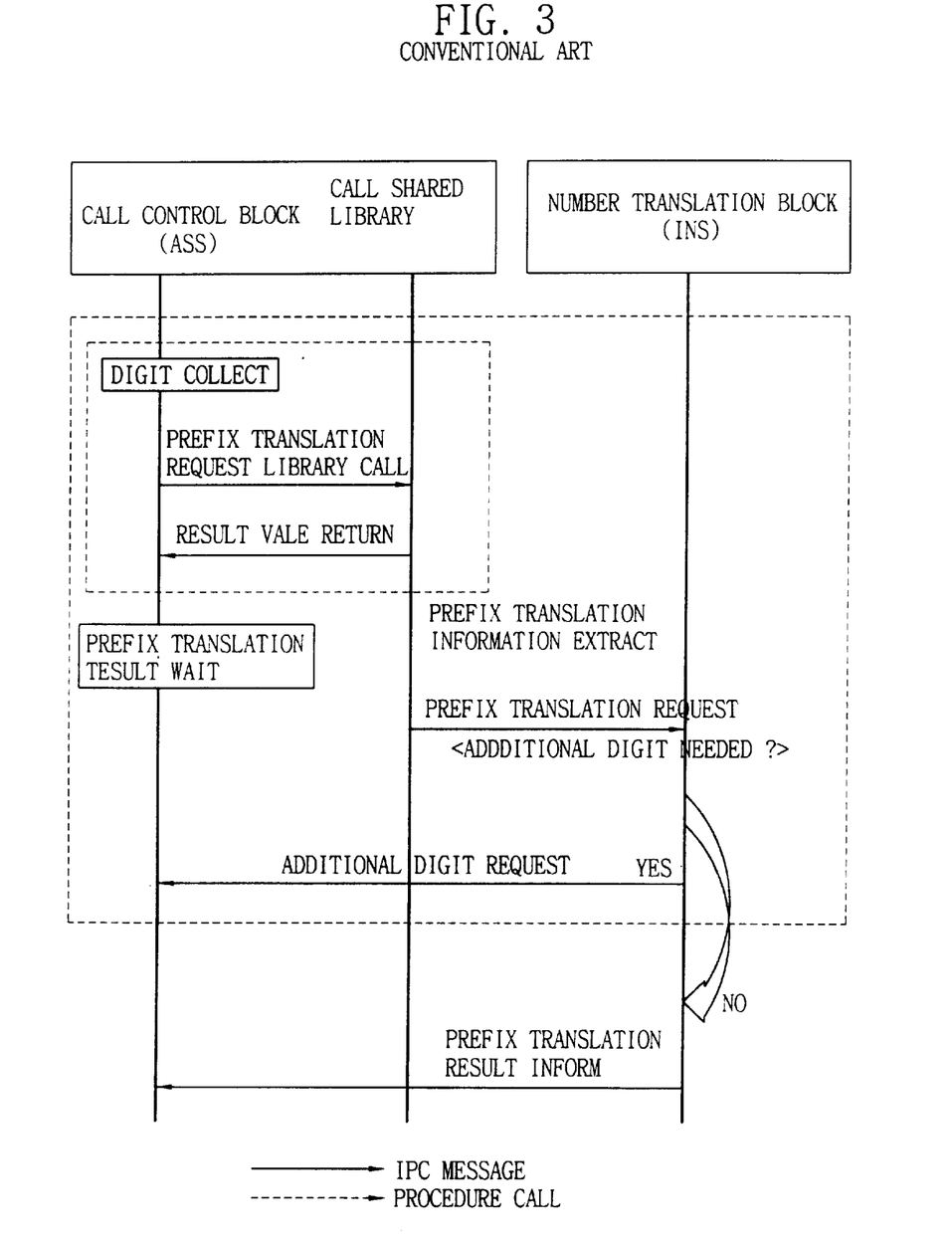
FIG. 3 is a diagram illustrating a prefix translation sequence in FIG. 2.

Also, as shown in FIG. 3, when translating the prefix, it is required to have two IPC messages between the ASS and the INS, one is for requesting the prefix translation and the other is for informing the prefix translation result), in its best situation. When the prefix translation result is the outgoing call, an IPC message is added thereto for a routing operation. However, a worse case, that is the additional digit request, is repeatedly carried out, it can be seen that the IPC message increases twice, which worsens an INS busy hour bottleneck. Further calls requesting the number translation occupy resources of the system in a waiting state, thereby lengthening delay time of a call.

SUMMARY OF THE INVENTION

Accordingly, the present invention is directed to a prefix translation dispersed configuration and method for an exchange system which obviates the problems and disadvantages in the conventional art.

An object of the present invention is to provide a prefix translation dispersed configuration and method for an exchange system that disperses a prefix translation process to ASSs from an ASS.

Another object of the present invention is to provide a prefix translation dispersed configuration and method that has a library which takes complete charge of prefix translation in each ASS and thus performs a prefix translation request generated during a call process through a library call.

Another object of the present invention is to provide a prefix translation dispersed configuration and method that simplifies a duplicated procedure of a call control block by unifying a common procedure to a library block in the call control block.

To achieve these and other advantages and in accordance with the purpose of the present invention, as embodied and broadly described herein, there is provided a prefix translation dispersed configuration for an exchange system which include an INS for performing number translation except for prefix translation and common functions of a call process, and ASSs horizontally and dispersedly connected to the INS and performing basic functions of the call process and the prefix translation.

Also, to achieve the objects of the present invention, in an exchange system consisting of an INS for performing common functions of a call process and suffix translation, and ASSs horizontally and dispersedly connected to the INS and performing basic functions of the call process and the prefix translation, there is provided a prefix translation method for the exchange system which includes calling a call shared library by collecting digit necessary for prefix translation from a call control block of the ASS, calling a prefix translation library by extracting various informations necessary for the prefix translation through the call shared library and then using the extracted informations as an input parameter, performing the prefix translation by searching a prefix table with digits provided as the input parameter with a key and returning a prefix translation result to the call control block as an output parameter, and performing a call process in accordance with a pattern of the output parameter returned from the prefix translation library block.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 4:
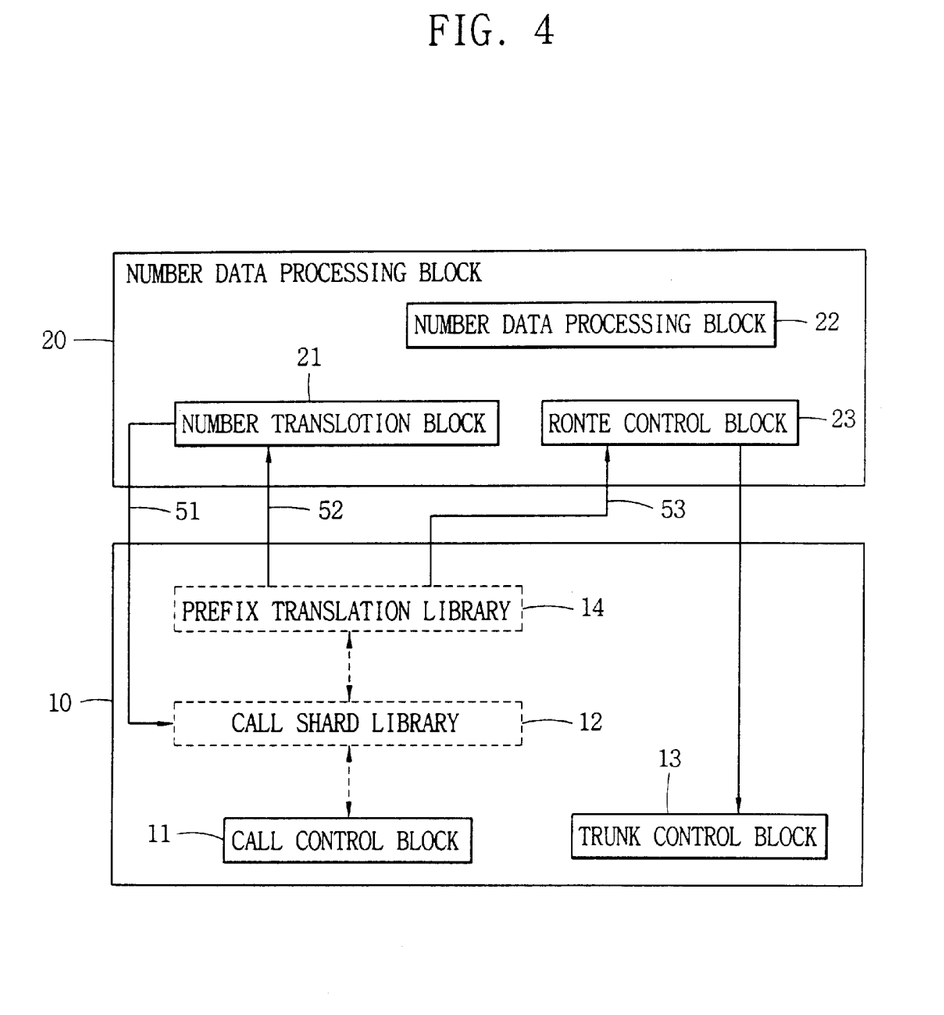
FIG. 4 is a schematic block diagram illustrating a prefix translation dispersed configuration of an exchange system according to the present invention.

FIG. 4 is a schematic block diagram illustrating a prefix translation dispersed configuration of an exchange system according to the present invention.

As shown therein, in the prefix translation dispersed configuration according to the present invention, a prefix translation library block which takes complete charge of prefix translation is additionally provided in each ASS 10, and as in the conventional art a number translation block 21 of an INS 20 translates a special service code or a suffix. Accordingly, to directly translate a general prefix in the ASS 10, all prefix data related to prefix information are configured as duplication data which are accessible to the ASS 10 and all prefix data in the ASS are managed to accord with each other when generating, changing and canceling data.

Further, to request the prefix translation only by a library call and return a result value without IPC transmission and receive, the prefix translation library block 14 is located in a previously defined common area which can be accessed by a call control block 11. Also, an interface library block for obtaining a logical address of the prefix translation library block 14 and an input/output (I/O) parameter are defined, the I/O parameter requesting corresponding prefix translation and returning a result thereof.

In the prefix translation dispersed configuration according to the present invention, the prefix data, the prefix translation library block and the interface library block are defined as follows.

Configuration of Prefix Data

All prefix data are loaded to the INS 20 and the ASSs 10 and defined as duplication data that are managed by the INS 20 and all of the ASSs 10. Accordingly, all processors related to data generation/change must be in a normal condition, and to prevent inconsistency all prefix related duplication data must be audited first in a data base audit and managed to be automatically released when the inconsistency occurs.

Configuration of a Prefix Translation Library Block

The prefix translation library block 14 is a set of procedures, translating a prefix by directly searching a prefix table with digits among input parameters in a procedure call as a key and returning a result value by loading in an output parameter if there exists corresponding information. The prefix translation library block 14 is loaded and linked in the previously defined common area which the call control block 11 can access, so that the call control block 11 may call as if it calls an interior procedure thereof.

The prefix translation library block 14 stores prefix translation processing procedures, a set of common procedures, in a specific area of a memory. The prefix translation library block 14 is constituted of an NTL_xxx.ch (CHILL file) which is a set of common procedures, a main NTL_.ch. storing logical addresses of the common procedures and data bases, and an NTL_xxx.sp defining logical numbers of the common procedures and the data bases.

Further, the common procedures are configured as independent procedures in accordance with an originating processor type of the call control block 11, that can be a procedure for performing prefix translation requested from a general/ISDN subscriber, a procedure for performing prefix translation requested from an incoming call control block, a procedure for performing prefix translation of an ISDN enbloc terminal subscriber, and a procedure for obtaining and storing logical addresses of prefix related data bases.

Configuration of an Interface Library Block

The interface library performs an interface procedure between the prefix translation library block 14 and the call control block 11. The interface library block consists of an INTL_manager copying and storing logical addresses of the common procedures and data bases and an I_xxx.ch which is a set of procedures that have 1:1 correspondence with common procedures defined in the NTL_xxx.ch and jump to the common procedures.

Accordingly, since the interface library block copies and stores logical addresses of procedures defined in the prefix translation library block 14, when the call control block 11 calls a specific prefix translation procedure, the interface library block one to one matches a corresponding logical address with an actual address of a procedure. That is, the interface library block is provided with an array that stores actual addresses of the procedures defined in the prefix translation library block 14 and thus prefix translation procedures which are used by the call control block 11 are mapped in accordance with a value stored in the array.

Thus, in a compile phase, the call control block 11 links A.out of the interface library block, thereby finding a location where an address value of the prefix translation library procedure is stored in the array and storing actual addresses of procedures in the location by initializing the interface library block. Here, it is noted that the call control block 11 performs the initialization by calling a prefix translation use routine in an interface library block and, if the initialization fails, returns an error. Accordingly, the call control block 11 can find the actual address where the prefix translation procedure exists in a call control process phase.

The prefix translation library use routine stores various common procedures and logical addresses of data bases in the prefix translation library block 14 and informs, using a primitive, an OS (operation system) of use of the prefix translation library 14.

Now, the prefix translation dispersed configuration for the exchange system according to the present invention will be described with reference to the accompanying drawings.

The call control block 11, the call shared library block 12 and the prefix translation library block 14 interface by transmitting and receiving parameters in accordance with previously agreed prefix translation library call and return patterns.

Figure 5:
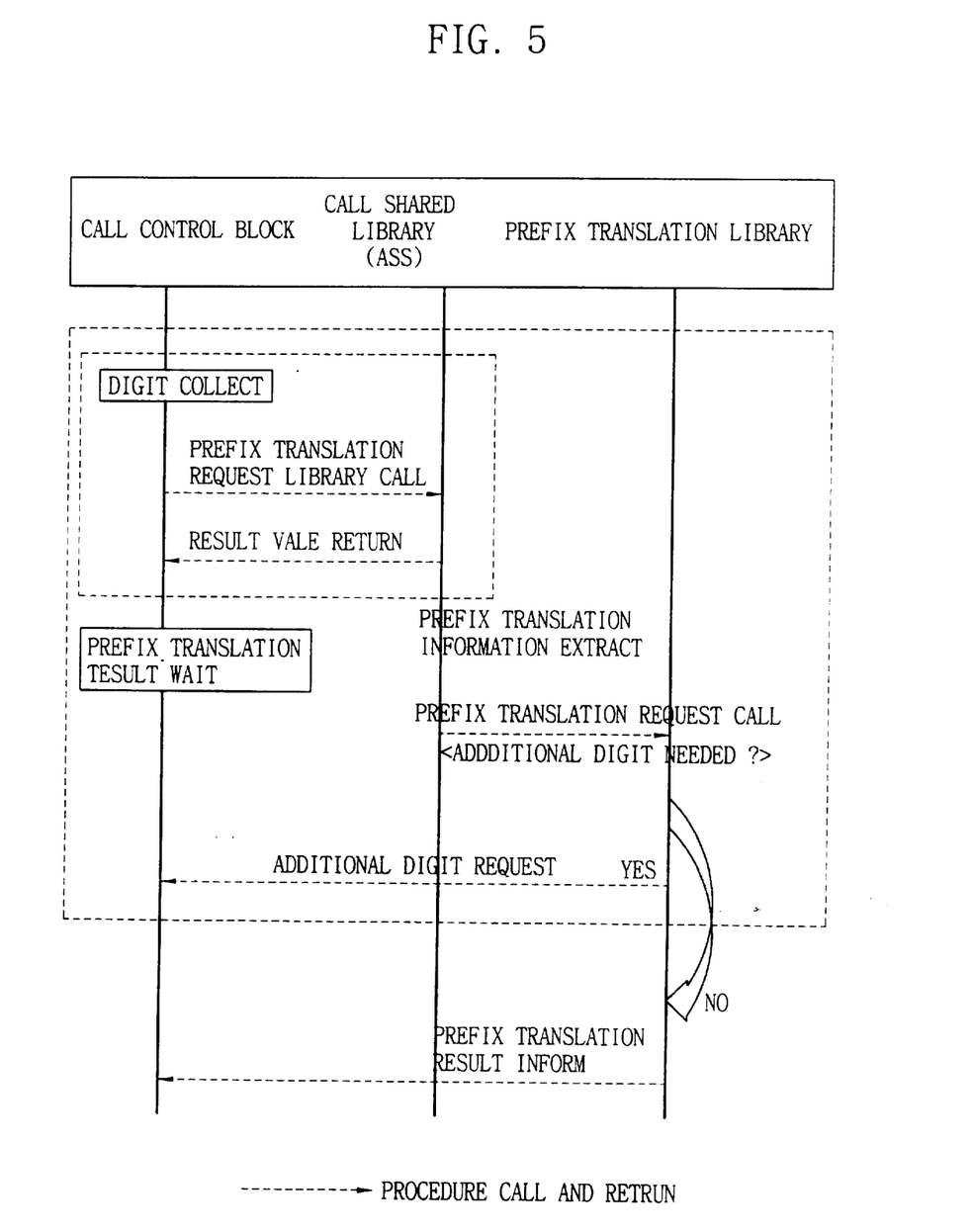
FIG. 5 is a diagram illustrating a prefix translation sequence in FIG. 4.

FIG. 5 is a diagram illustrating a prefix translation sequence through the prefix translation library block 14. As shown therein, when digits necessary for the prefix translation are collected, the call control block 11 calls the call shared library block 12 using an logical address of the common area where there are stored various call common informations required to perform the call process.

A prefix translation request library in the call shared library block 12 extracts various informations necessary for the prefix translation and calls the prefix translation library 14 in a call shared library procedure using the extracted informations as parameters.

Here, since prefix translation information is too much to be transmitted as individual input parameters when calling the prefix translation procedure, a location pointer of a call information stored in the specific location is transmitted as a parameter. The call information exists in a location where the prefix translation library block 14 directly accesses and values necessary for the prefix translation are obtained by extracting the call information with the location pointer of the call information as an index, the call information being transmitted as an input information.

The call control block 11 links the interface library block when calling the prefix translation library block 14 and initializes the interface library block by calling the prefix translation library use routine. Accordingly, the prefix translation library use routine copies and stores logical addresses of various common procedures and data bases in the prefix translation library block 14 and jumps to a common procedure having 1:1 correspondence with a common procedure defined in the NTL_xxx.ch. Also, the prefix translation library use routine informs the OS of the use of the prefix translation library block 14 and if the initialization fails, the prefix translation library use routine returns an error.

Thus, the prefix translation library block 14 which is called searches the prefix table with digits based on contents of transmitted call information as a key, checks whether there is a prefix that matches digits required for the translation, and returns a result value to the call control block 11.

Here, as a call result return value, the prefix translation library block 14 returns a parameter indicating a 'prefix translation performance' and a parameter of a 'prefix translation prefix result' which has detailed information in translation completion, the parameter indicating the 'prefix translation performance' having three patterns of 'translation complete (complete)', 'additional information needed (not_yet)' and 're-transmission to a number translation block (signal_wait)'.

Thus, as a result of the prefix translation, if a prefix which is requested for the translation is a special number or a code of which a terminating code control becomes effective, the prefix translation library block 14 again requests the prefix translation to the number translation block 21 through an IPC link 50 and returns 'signal_wait' to the parameter of the prefix translation performance. As a result, in accordance with the parameter 'signal_wait', the call control block 11 waits a translation result provided by the number translation block 21 of the INS through an IPC link 51.

If the information of the translation requested prefix is not sufficient as many as digits necessary for the prefix translation, the prefix translation library block 14 obtains the number of digits that are required for the prefix translation and then returns 'not_yet' to the parameter of the prefix translation performance' and 'additional digit request' to the parameter of the prefix translation result. Accordingly, the call control block 11 receives the above parameters, collects more digits as many as the number of digits loaded in the parameter of prefix translation result and calls the prefix translation request library.

While, if the digit information of the translation requested call is sufficient and the corresponding prefix is not the special number or the suffix, the prefix translation library block 14 returns the 'complete' to the parameter of the prefix translation performance and detailed information, that is, result values of an intra-office call, an incoming or outgoing call, and a transit call, to the parameter of the prefix translation result. Here, if the corresponding prefix is an outgoing prefix and digits necessary for routing are sufficient, the prefix translation library block 14 directly requests routing to a route control block 23 through an IPC link 53.

If the prefix translation result is an unobtainable or changed prefix, the call control block 11 connects an announcement, and if the result is an intra-office prefix, the call control block 11 transits to an incoming prefix collecting state. The route control block 23 searches a route through which the outgoing call or the transit call is transmitted and requests a trunk control block 13 to seize a corresponding trunk, the trunk control block 13 seizing the trunk and transits a corresponding call to the destination.

The number translation block 21 processes all of the number which can not be translated in the prefix translation library block 14. That is, the number translation block 21 performs special number and suffix translation requests made by the subscriber and the incoming call and then returns a number translation result to the originating party, while if the translation result is an intra-office suffix, the number translation block 21 requests a terminating line occupying request to the call control block 11.

As described above, the prefix code translation dispersed configuration for the exchange system and the method thereof according to the present invention have an effect of implementing the number translation configuration which is more stable by avoiding the centralized number translation configuration in the conventional art.

More particularly, according to the present invention, there is provided the prefix translation library block taking the complete charge of the prefix translation in the ASS and thus there is an effect of reducing the load of the number translation block when the call congestion occurs and improving the performance of the system. Also, the prefix translation library block directly returns a result value with respect to a code among terminating code control registered prefixes of which control does not become effective, thereby solving load concentration of the number translation block due to network management control.

Further, the prefix code translation dispersed configuration for an exchange system and the method thereof according to the present invention transfers the prefix translation process to the distributed ASSs and performs the prefix translation requested during the call process through the library call, thus simplifying the IPC transmission and receive procedures between the processors. Namely, in the conventional exchange system, at least the two exterior IPC messages are required between the ASS and the INS when translating the prefix. However, as shown in FIG. 5, in the prefix translation dispersed configuration according to the present invention the interior/exterior IPC messages are not used in the prefix translation. Further, the IPC messages existing between the ASS and the INS for the prefix translation have only the suffix translation request ASSIN S and the terminating line occupying request INS ASS in the case of the intra-office call, but if there is the transit call, there is only required the route request ASSIN S. Further, according to the present invention, since the prefix translation in the ASSs is accomplished through the library block, the IPC transmission and receive repeating procedure is eliminated, which is necessary when requesting additional digits in the conventional art. Thus, the prefix code translation dispersed configuration for the exchange system and the method thereof according to the present invention can simplify the IPC transmission and receive procedure, thereby optimizing the memory by which a stack size of the control block becomes minimized and reducing the call delay time and the resource occupancy of each processor.

It will be apparent to those skilled in the art that various modifications and variations can be made in the prefix code translation dispersed configuration and method for the exchange system of the present invention without departing from the spirit or scope of the invention. Thus, it is intended that the present invention cover the modifications and variations of this invention provided they come within the scope of the appended claims and their equivalents.

What is claimed is:

1. A prefix translation dispersed configuration for an exchange system, comprising:
   an INS for performing number translation except for prefix translation and common functions of a call process; and
   ASSs horizontally and dispersedly connected to the INS and performing basic functions of the call process and the prefix translation.

2. The prefix translation dispersed configuration according to claim 1, wherein each ASS includes:
   a call control block for collecting digits necessary for the prefix translation through a subscriber terminal;
   a call shared library block extracting digit and call information necessary for the prefix translation from a common area in accordance with a library call of the call control block;
   a prefix translation library block for receiving the digit and call information from the call shared library block as an input parameter, determining whether there exists in a prefix table a prefix value matching translation requested digits and returning a translation result value to an output parameter; and
   a trunk control block for seizing a trunk through which a corresponding call is to be transited in accordance with a trunk seizing control signal outputted from the INS.

3. The prefix translation dispersed configuration according to claim 2, wherein the prefix translation library block is loaded and linked to a previously defined common area which the call control block or the trunk control block can access.

4. The prefix translation dispersed configuration according to claim 2, wherein the prefix translation library block requests the prefix translation to the INS if a translation requested prefix is a suffix or a special number, and prefix data of the prefix table are duplication data managed by the INS and the ASSs.

5. The prefix translation dispersed configuration according to claim 2, wherein the prefix translation library block directly requests routing to the INS if the translation requested prefix is a trunk line prefix and digits necessary for the routing are sufficient.

6. The prefix translation dispersed configuration according to claim 2, wherein the output parameter consists of:
   a first parameter indicating a prefix translation performance; and
   a second parameter indicating a prefix translation result which a detailed result of the prefix translation.

7. The prefix translation dispersed configuration according to claim 6, wherein the first parameter has three patterns which are translation complete (complete), additional information needed (not_yet) and re-transmission to the INS (signal_wait).

8. The prefix translation dispersed configuration according to claim 2, wherein the prefix translation library block consists of:
   a first CHILL file which is a set of common procedures;
   a second CHILL file which stores logical addresses of the common procedures and data bases; and
   a third CHILL file which defines logical numbers of the common procedures and the data bases.

9. The prefix translation dispersed configuration according to claim 8, wherein the common procedures are constituted of:
   a procedure for performing a prefix translation request of a general/ISDN subscriber;
   a procedure for performing a prefix translation request of an incoming call control block;
   a procedure for performing a prefix translation request of an ISDN Enbloc terminal subscriber; and
   a procedure for storing logical addresses of prefix related data bases.

10. The prefix translation dispersed configuration according to claim 2, further comprising:
    an interface library block for performing an interface process between the prefix translation library and the call control block.

11. The prefix translation dispersed configuration according to claim 10, wherein when calling the prefix translation library the call control block links the interface library and initializes the interface library by calling a prefix translation library use routine.

12. The prefix translation dispersed configuration according to claim 10, wherein the interface library block consists of:
    a manager for copying and storing logical addresses of common procedures and data bases of the prefix translation library; and
    a fifth CHILL file which is a set of procedures that have 1:1 correspondence with common procedures defined in the prefix translation library and thus jump to the common procedures.

13. The prefix translation dispersed configuration according to claim 12, wherein the interface library copies and stores logical addresses of procedures defined in the prefix translation library block and has 1:1 correspondence with an actual address of a corresponding procedure when the call control block calls a prefix translation procedure.

14. In an exchange system consisting of an INS for performing common functions of a call process and suffix translation, and ASSs horizontally and dispersedly connected to the INS and performing basic functions of the call process and the prefix translation, a prefix translation method for the exchange system, comprising the steps of:
    calling a call shared library by collecting digit necessary for prefix translation from a call control block of the ASSs;
    calling a prefix translation library by extracting various informations necessary for the prefix translation through the call shared library and then using the extracted informations as an input parameter;
    performing the prefix translation by searching a prefix table with digits provided as the input parameter with a key and returning a prefix translation result to the call control block as an output parameter; and
    performing a call process in accordance with a pattern of the output parameter returned from the prefix translation library block.

15. The prefix translation method according to claim 14, wherein the prefix table is provided in the ASS and prefix data of the prefix table are duplication data managed by the INS and the ASSs.

16. The prefix translation method according to claim 14, wherein the prefix translation library block is loaded and linked to a previously defined common area which the call control block or a trunk control block can access.

17. The prefix translation method according to claim 14, wherein, the prefix translation library block consists of:
    first CHILL file which is a set of common procedures;

a second CHILL file which stores logical addresses of the common procedures and data bases; and a third CHILL file which defines logical numbers of the common procedures and the data bases.

18. The prefix translation method according to claim 17, wherein, the common procedures are constituted of:

a procedure for performing a prefix translation request of a general/ISDN subscriber;

a procedure for performing a prefix translation request of an incoming call control block;

a procedure for performing a prefix translation request of an ISDN Enbloc terminal subscriber; and a procedure for storing logical addresses of prefix related data bases.

19. The prefix translation method according to claim 14, wherein, the step of performing the prefix translation and returning the result further includes:

requesting additional digits to the call control block if prefix information is not sufficient as the number of digits necessary for the prefix translation;

requesting again the prefix translation to the INS if a corresponding prefix is a code or a special number of which a terminating code control becomes effective; and requesting direct routing to the INS if the corresponding prefix is an outgoing prefix and there are sufficient digits necessary for the routing.

20. The prefix translation method according to claim 14, wherein, the output parameter consists of:

a first parameter indicating a prefix translation performance; and a second parameter indicating a prefix translation result which a detailed result of the prefix translation.

21. The prefix translation method according to claim 20, wherein the first parameter has three patterns which are translation complete (complete), additional information needed (not_yet) and re-transmission to the INS (signal_wait).

* * * * *